US011333217B2

(12) United States Patent
Cazares et al.

(10) Patent No.: US 11,333,217 B2
(45) Date of Patent: May 17, 2022

(54) DRIVE ASSEMBLY INCLUDING HUB ASSEMBLY EXTENSION

(71) Applicant: Schaeffler Technologies AG & Co. KG, Herzogenaurach (DE)

(72) Inventors: Ing. Juan Pablo Cazares, Puebla (MX); Angel Josue Lopez, Puebla (MX)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 949 days.

(21) Appl. No.: 16/101,508

(22) Filed: Aug. 12, 2018

(65) Prior Publication Data

US 2020/0049227 A1 Feb. 13, 2020

(51) Int. Cl.
*F16F 15/123* (2006.01)

(52) U.S. Cl.
CPC .... *F16F 15/12393* (2013.01); *F16F 15/1232* (2013.01); *F16F 15/12313* (2013.01); *F16F 2230/0005* (2013.01); *F16F 2232/02* (2013.01); *F16F 2236/04* (2013.01); *F16F 2238/022* (2013.01); *F16F 2238/026* (2013.01)

(58) Field of Classification Search
CPC ........... F16F 15/12393; F16F 15/12313; F16F 15/1232; F16F 15/1213; F16F 15/1216; F16F 2238/022; F16F 2238/026; F16F 2236/08
See application file for complete search history.

(56) References Cited

U.S. PATENT DOCUMENTS

| | | | | |
|---|---|---|---|---|
| 6,176,362 | B1* | 1/2001 | Arhab | F16F 15/12313 |
| | | | | 192/213.1 |
| 2008/0149444 | A1* | 6/2008 | Degler | F16D 25/0638 |
| | | | | 192/3.33 |
| 2013/0081511 | A1* | 4/2013 | Ebata | F16H 41/24 |
| | | | | 74/574.4 |
| 2015/0323038 | A1* | 11/2015 | Tomiyama | F16F 15/1343 |
| | | | | 464/51 |
| 2017/0299014 | A1* | 10/2017 | Nakatani | F16F 15/1232 |
| 2018/0087584 | A1* | 3/2018 | Al-Kattan | F16F 15/1232 |

* cited by examiner

*Primary Examiner* — Vishal R Sahni
(74) *Attorney, Agent, or Firm* — Davidson, Davidson & Kappel, LLC

(57) ABSTRACT

A drive assembly for a vehicle drive train includes a base assembly including a base hub configured for non-rotatably connecting to an outer circumferential surface of a transmission input shaft. The base assembly includes a torsional damper fixed to the base hub. The torsional damper includes an input section and an output section drivingly connected by springs. The springs allow relative rotation between the input section and the output section. The output section of the torsional damper is non-rotatably fixed to the base hub. A hub assembly extension is configured for non-rotatably connecting to an engine crankshaft. The hub assembly extension is non-rotatably fixed to the input part of the torsional damper at an engine side of the torsional damper. The torsional damper allows relative rotation between the hub assembly extension and the base hub.

20 Claims, 5 Drawing Sheets

DRIVE ASSEMBLY INCLUDING HUB ASSEMBLY EXTENSION

The present disclosure relates generally to drive assemblies and more specifically to drive assemblies for connecting an engine crankshaft to a transmission in marine applications.

BACKGROUND

Conventionally, boat drive trains may include a damper assembly between the internal combustion engine and the transmission.

SUMMARY OF THE INVENTION

A drive assembly for a vehicle drive train includes a base assembly including a base hub configured for non-rotatably connecting to an outer circumferential surface of a transmission input shaft. The base assembly includes a torsional damper fixed to the base hub. The torsional damper includes an input section and an output section drivingly connected by springs. The springs allow relative rotation between the input section and the output section. The output section of the torsional damper is non-rotatably fixed to the base hub. A hub assembly extension is configured for non-rotatably connecting to an engine crankshaft. The hub assembly extension is non-rotatably fixed to the input part of the torsional damper at an engine side of the torsional damper. The torsional damper allows relative rotation between the hub assembly extension and the base hub.

According to embodiments of the drive assembly, the hub assembly extension may include an extension hub configured for non-rotatably connecting to an outer circumferential surface of the engine crankshaft. The hub assembly extension may include an extension flange including a radially inner section non-rotatably connected to an outer circumferential surface of the extension hub. The extension flange may be non-rotatably fixed to the input section of the torsional damper. The extension flange may non-rotatably fixed to the input section of the torsional damper by fasteners passing through a radially outer section of the extension flange. The extension flange may include a sloped intermediate section radially between the radially inner section and the radially outer section. The sloped intermediate section may extend axially toward the torsional damper while extending radially outward from the radially inner section to the radially outer section. The input part may include an engine side cover plate and a transmission side cover plate each including windows for receiving the springs. The engine side cover plate may include a radially outer section outside of the windows thereof and the fasteners may pass through the radially outer section of the engine side cover plate. An inner diameter of the extension hub may be greater than an inner diameter of the base hub. The base hub and the extension hub may be separate parts connected together by the torsional damper and the extension flange such that the torsional damper allows relative rotation between the extension hub and the base hub.

A method of constructing a drive assembly for a vehicle drive train includes constructing a base assembly including a base hub configured for non-rotatably connecting to an outer circumferential surface of a transmission input shaft. The base assembly includes a torsional damper fixed to the base hub. The torsional damper includes an input section and an output section drivingly connected by springs. The springs allow relative rotation between the input section and the output section. The output section of the torsional damper is non-rotatably fixed to the base hub. The method also includes non-rotatably fixing a hub assembly extension to the input part of the torsional damper at an engine side of the torsional damper. The hub assembly extension is configured for non-rotatably connecting to an engine crankshaft. The torsional damper allows relative rotation between the hub assembly extension and the base hub.

According to embodiments of the method, the method may further include constructing the hub assembly extension by non-rotatably connecting a radially inner section of an extension flange to an outer circumferential surface of an extension hub. The extension hub may be configured for non-rotatably connecting to an outer circumferential surface of the engine crankshaft. The non-rotatably fixing of the hub assembly extension to the input part of the torsional damper may include non-rotatably fixing the extension flange to the input section of the torsional damper. The extension flange may be non-rotatably fixed to the input section of the torsional damper by fasteners passing through a radially outer section of the extension flange. The extension flange may include a sloped intermediate section radially between the radially inner section and the radially outer section. The sloped intermediate section may extend axially toward the torsional damper while extending radially outward from the radially inner section to the radially outer section. The input part may include an engine side cover plate and a transmission side cover plate each including windows for receiving the springs. The engine side cover plate may include a radially outer section outside of the windows thereof. The fasteners may pass through the radially outer section of the engine side cover plate. An inner diameter of the extension hub is greater than an inner diameter of the base hub.

BRIEF DESCRIPTION OF THE DRAWINGS

The present invention is described below by reference to the following drawings, in which.

DETAILED DESCRIPTION

The present disclosure provides a drive assembly for connecting an engine crankshaft to a transmission in marine applications. The drive assembly includes a hub assembly extension configured for acting together and relatively with the torsional damper, so as to facilitate assembling the drive assembly and to couple a torsional damper of high torque in a small space. The drive assembly can be used in a boat drive train to damp vibrations while allowing relative rotation between the engine crankshaft and the transmission.

An inner diameter of the hub assembly extension may be splined according to desired specifications. A flange of the hub assembly extension may include external holes to receive fasteners, e.g., rivets, to join the hub assembly extension with the damper. The flange of the hub assembly extension may include external holes for the release of spacer bolts of the damper. The flange of the hub assembly extension may include windows to receive wing heights from the cover plate. The flange of the hub assembly extension may include guide holes to facilitate the final assembly.

Figure 1:
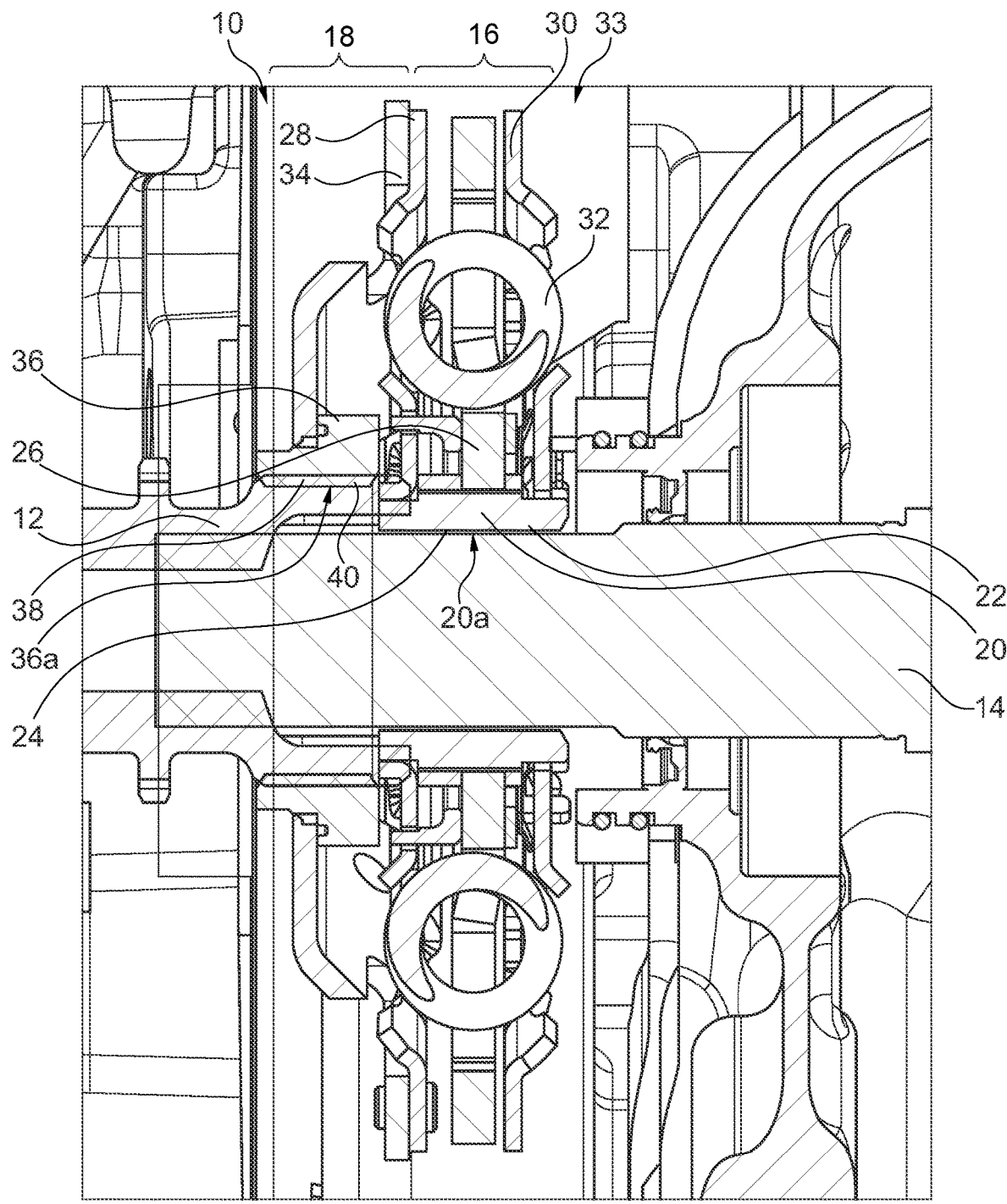
FIG. 1 shows a radial cross-sectional view of a drive assembly connecting an engine crankshaft to a transmission in accordance with an embodiment of the invention.

FIG. 1 shows a radial cross-sectional view of a drive assembly 10 connecting an engine crankshaft 12 to a transmission input shaft 14 in accordance with an embodiment of the invention. Drive assembly 10, crankshaft 12 and transmission input shaft 14 are configured for being arranged concentric to a center axis CA, about which drive assembly 10, crankshaft 12 and transmission input shaft 14 rotate during operation. Unless otherwise specified, the terms axial, radial and circumferential and derivations thereof are used with respect to center axis CA. Drive assembly 10 includes a base assembly 16 configured for connecting to transmission input shaft 14 and a hub assembly extension 18 configured for connecting to crankshaft 12.

Base assembly 16 includes an annular base hub 20 configured for non-rotatably connecting to transmission input shaft 14. More specifically, base hub 20 includes splines or teeth 22 on an inner circumferential surface 20a thereof configured for non-rotatably intermeshing with splines or teeth 24 on an outer circumferential surface of transmission input shaft 14. A base flange 26 is non-rotatably fixed to base hub 20 at an outer circumferential surface of base hub 20. Base assembly 16 further includes a front or engine side cover plate 28 and a rear or transmission side cover plate 30 that are drivingly connected to flange 26 by coil springs 32. Springs 32 circumferentially compress and expand during operation to allow relative rotation between flange 26 and cover plates 28, 30, which in turn allows relative rotation between crankshaft 12 and transmission input shaft 14. Base flange 26, cover plates 28, 30 and springs 32 together form a damper 33, with cover plates 28, 30 forming a torque input section of damper 33 and base flange 26 forming a torque output section of damper 33.

Hub assembly extension 18 includes an extension flange 34 that is non-rotatably fixed to engine side cover plate 28 and an annular extension hub 36 configured for non-rotatably connecting to crankshaft 12. Base hub 20 and extension hub 36 are formed as separate parts that are connected together by damper 33 and extension flange 34. More specifically, extension hub 36 includes splines or teeth 38 on an inner circumferential surface 36a thereof configured for non-rotatably intermeshing with splines or teeth 40 on an outer circumferential surface of crankshaft 12. Extension hub 36 includes a borehole having a greater diameter than a borehole of base hub 20 such that inner circumferential surface 36a of extension hub 36 is greater than inner circumferential surface 20a of base hub 20. Extension flange 34 is non-rotatably fixed to extension hub 36 at an outer circumferential surface of extension hub 36.

Figure 2:
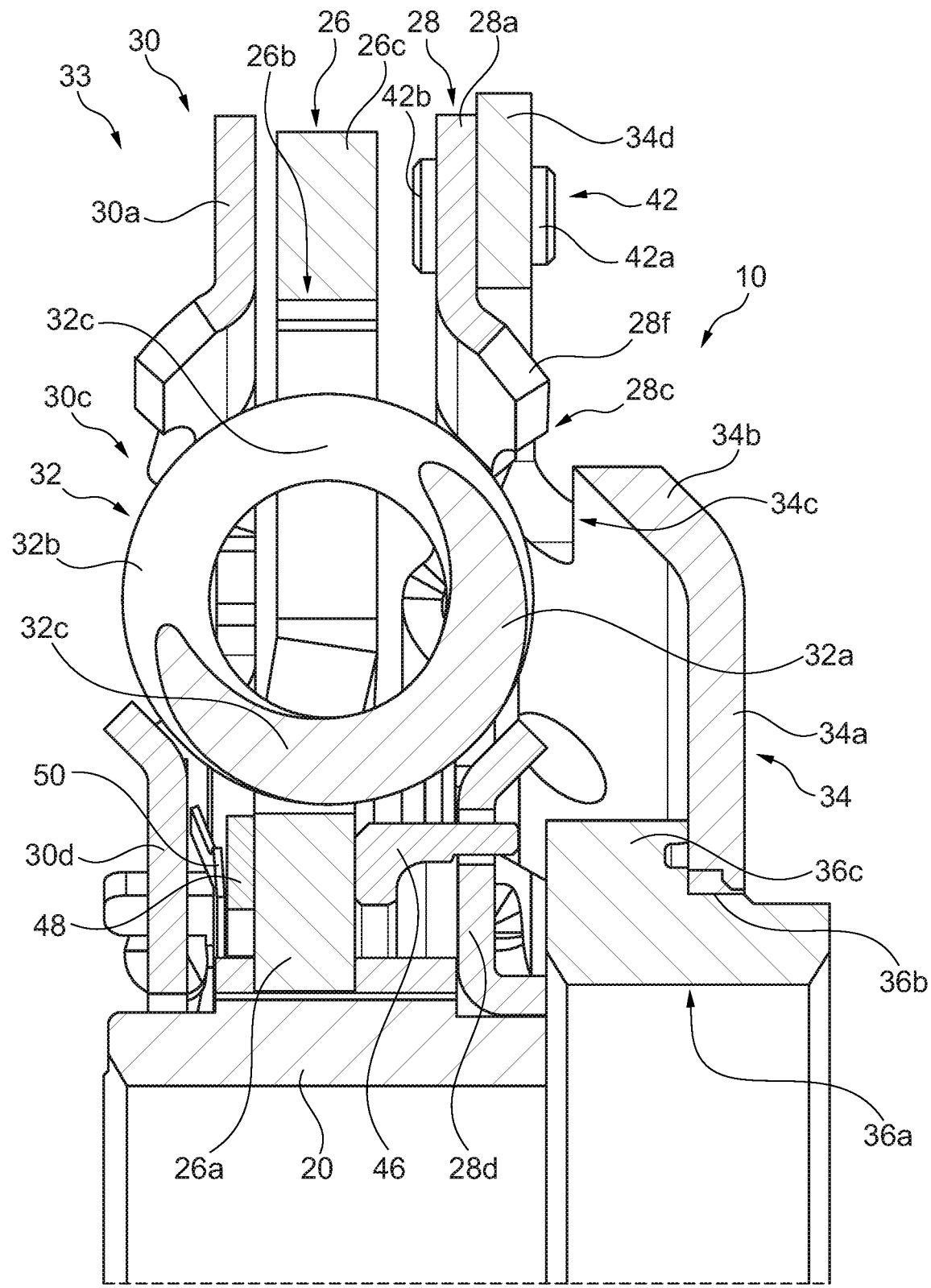
FIG. 2 shows an enlarged radial cross-sectional view of the drive assembly shown in FIG. 1.

FIG. 2 shows an enlarged view of drive assembly 10. Extension flange 34 is permanently fixed to extension hub 36 for example via extension flange 34 being pressed onto extension hub 36 such that splines on inner circumferential surface 36a of extension flange 34 cut into an outer circumferential surface of a portion 36b of extension hub 36. Extension hub 36 is provided with a shoulder 36c, which is axially adjacent to portion 36b and extends further radially outward than portion 36b, that axially abuts extension flange 34 via a transmission side surface extension flange 34. More specifically, a radially inner section 34a of extension flange, which is aligned perpendicular to center axis CA, axially abuts shoulder 36c. Radially outside of radially inner section 34a, extension flange 34 includes a sloped intermediate section 34b extending axially away from radially inner section 34a and toward engine side cover plate 28, while extending radially outward. Sloped intermediate section 34b is provided with a plurality of circumferentially spaced windows 34c and extends radially outward into a radially outer section 34d of extension flange 34. Windows 34c receive wings 28f of cover plate 28, which form an outer circumferential edge of windows 28c and protrude axially away from and radially inward from section 28a. Radially outer section 34d is aligned perpendicular to center axis CA and, at a transmission side surface thereof, axially abuts a radially outer section 28a of engine side cover plate 28.

Figure 3:
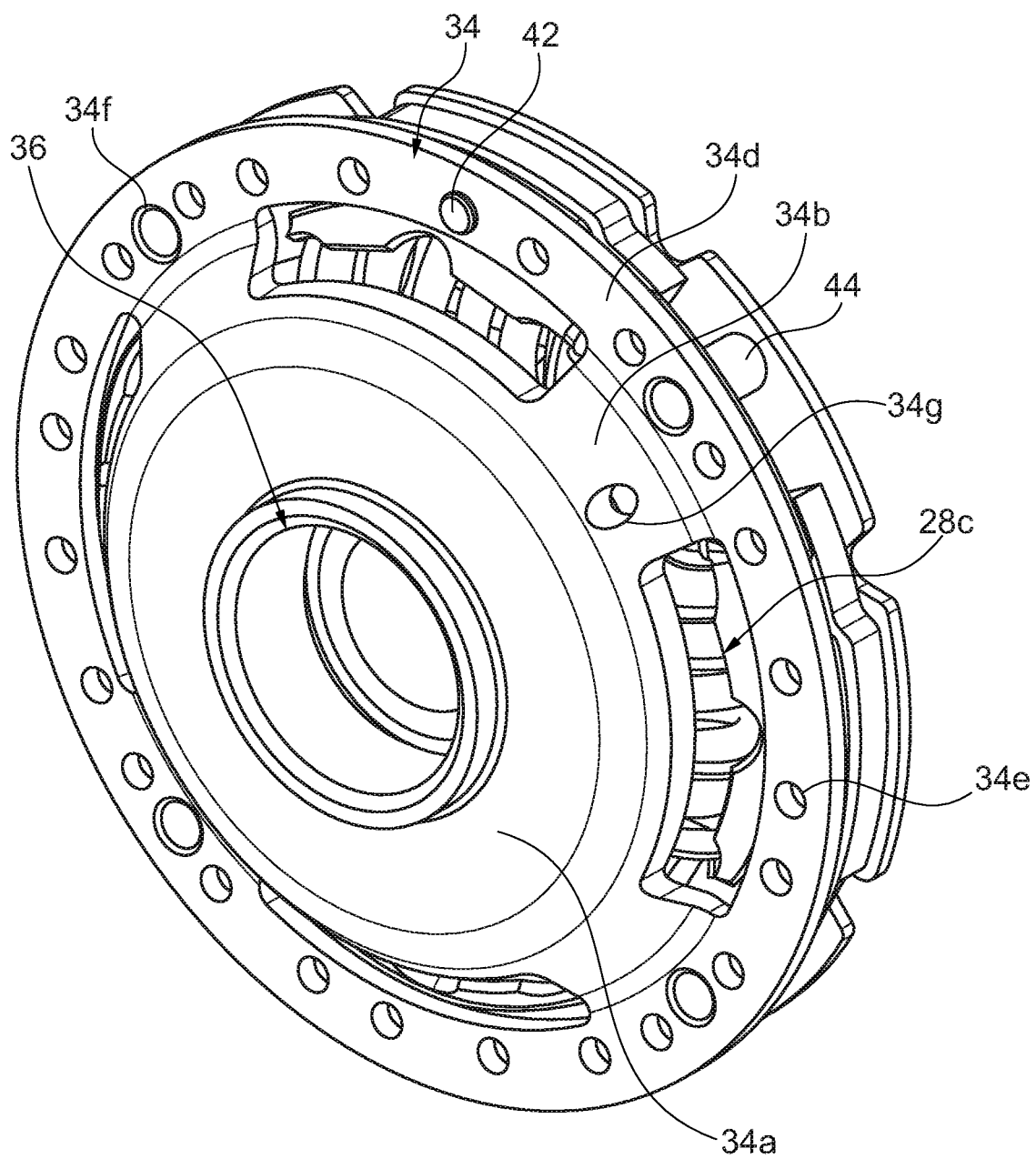
FIG. 3 shows an engine side perspective view of the drive assembly shown in FIG. 1.
Figure 5:
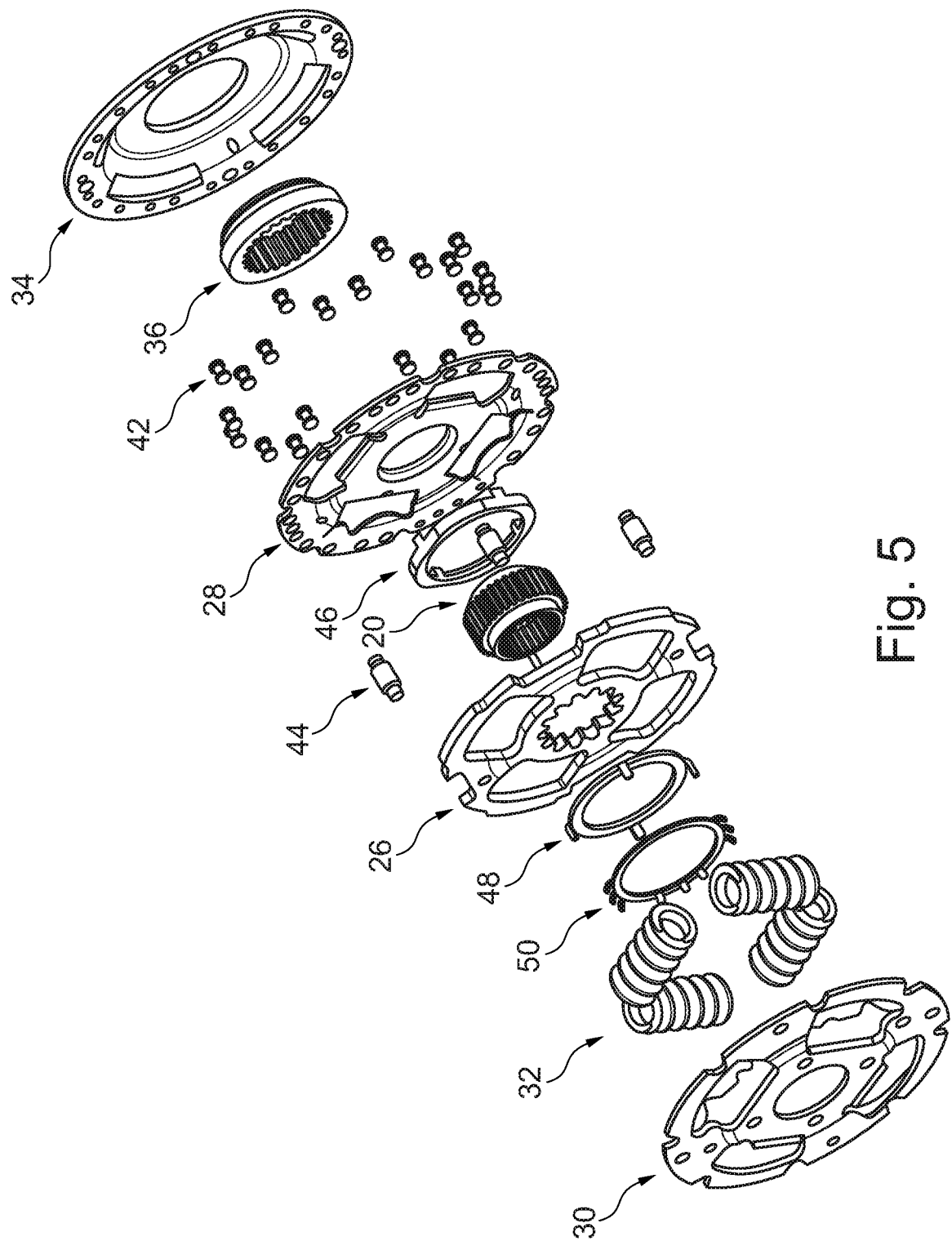
FIG. 5 shows an exploded view of the drive assembly shown in FIG. 1.

FIG. 3 shows an engine side perspective view of the drive assembly shown in FIG. 1. FIG. 5 shows an exploded view of the drive assembly 10 shown in FIG. 1. Referring to FIGS. 2, 3 and 5 together, extension flange 34 is fixed to engine side cover plate 28 via a plurality of circumferentially spaced fasteners 42. Fasteners 42 pass through holes 34e in radially outer section 34d of extension flange 34 and holes 28b in radially outer section 28a of engine side cover plate 28. Radially outer section 34d of extension flange 34 also includes holes 34f circumferentially offset from holes 34e that receive heads of spacer bolts 44, which are further described below. Holes 34f have a larger diameter than the heads of spacer bolts 44. Intermediate section 34b also includes guide holes 34g circumferentially between windows 34c. During the assembly process, carrier guides have pins that pass through guide holes 34g to align the components of drive assembly 10 in the correct position to aid in the assembly process. Fasteners 42, which in one embodiment are rivets, each include a first head 42a for contacting an engine side surface of radially outer section 34a of extension flange 34 and a second head 42b for contacting an engine side surface of radially outer section 28a of engine side cover plate 28. Radially inside of radially outer section 28a, cover plate 28 includes a plurality circumferentially spaced windows 28c, with each of windows 28c receiving an engine side section 32a of one of springs 32. Radially inside of windows 28c, cover plate 28 includes a radially inner section 28d rotatably positioned at the outer circumferential surface of base hub 20.

Figure 4:
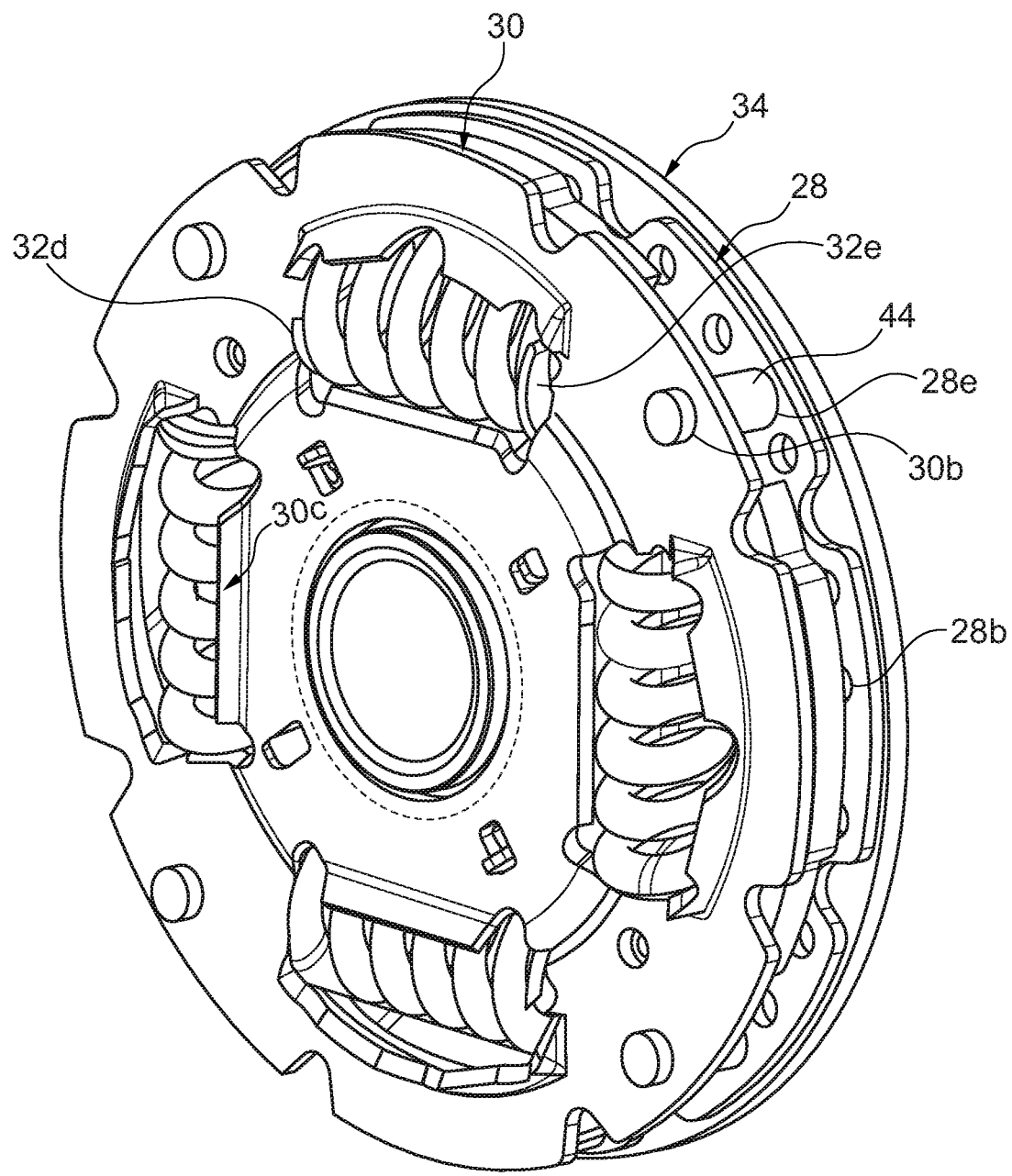
FIG. 4 shows a transmission side perspective view of the drive assembly shown in FIG. 1.

FIG. 4 shows a transmission side perspective view of the drive assembly shown in FIG. 1. Referring to FIGS. 2 to 4 together, engine side cover plate 28 is fixed to transmission side cover plate 30 by a plurality of circumferentially spaced spacer bolts 44, which also axially space cover plates 28, 30 from each other by holding radially outer section 28a of cover plate 28 a fixed axial distance from a radially outer section 30a of cover plate 30. Spacer bolts 44 pass through holes 28e in radially outer section 28a of engine side cover plate 28 and holes 30b in radially outer section 30a of transmission side cover plate 30. Radially inside of radially outer section 30a, cover plate 30 includes a plurality circumferentially spaced windows 30c, with each of windows 30c receiving a transmission side section 32b of one of springs 32. Radially inside of windows 30c, cover plate 30 includes a radially inner section 30d rotatably positioned at the outer circumferential surface of base hub 20.

Base flange 26 is provided axially between cover plates 28, 30 and includes a radially inner section 26a permanently non-rotatably fixed directly to the outer circumferential surface of base hub 20. Radially outside of radially inner section 26a, base flange 26 includes a plurality circumferentially spaced windows 26b, with each of windows 26b receiving an axially center section 32c of one of springs 32. Radially outside of windows 26c, flange 26 includes a radially outer section 26c includes a plurality of circumferentially spaced cutouts 26d, which spacer bolts 44 extend axially through. Cutouts 26d allow spacer bolts 44 to move circumferentially within flange 26 during relative rotational movement of cover plates 28, 30 with respect to flange 26. Damper 33 is configured such that during relative rotation of base flange 26 with respect to cover plates 28, 30, circumferential edges of windows 28c, 30c can contact first circumferential ends 32d of springs while circumferential edges of windows 26b contact second circumferential ends 32e of springs 32 to compress springs 32.

Drive assembly 10 is configured to drivingly connect crankshaft 12 and transmission input shaft 14 together such that torque is input into drive assembly 10 via hub assembly extension 18. Torque flows from crankshaft 12 through extension hub 36 to extension flange 34. Extension flange 34 drives cover plates 28, 30 which then transfer torque through springs 32 to base flange 26, which drives base hub 20. Base hub 20 in turn transfers torque directly to transmission input shaft 14.

A method of assembling the drive assembly 10 may include the steps of fixing the cover plate 28 and extension flange 34 together via rivets 42, then adding plastic spacers 46 onto cover plate 28. Next, flange 26 is pressed against spacers 46, and hub 20 is inserted into flange 26 and cover plate 28. Coil springs 32 are then inserted into windows 26b and windows 28c, and a support washer 48 is pressed against flange 26. A diaphragm spring 50 is then pressed onto support washer 48, and first ends of spacer bolts 44 are inserted to holes in cover plate 28. Cover plate 30 is then pressed against diaphragm spring 50, such that holes in cover plate 30 receive second ends of spacer bolts 44. Next, the first and second ends of the spacer bolts 44 are riveted to fix cover plates 28, 30 together.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

LIST OF REFERENCE NUMERALS 10 drive assembly
12 engine crankshaft
14 transmission input shaft
16 base assembly
18 hub assembly extension
20 base hub
20a inner circumferential surface
22 splines or teeth
24 splines or teeth
26 base flange
26a radially inner section
26b windows
26c radially outer section
28 engine side cover plate
28a radially outer section
28b fastener holes
28c windows
28d radially inner section
28e spacer holes
28f wings
30 transmission side cover plate
30a radially outer section
30b spacer holes
30c windows
30d radially inner section
32 springs
32a engine side section
32b transmission side section
32c axially center section
32d first circumferential ends
32e second circumferential ends
33 damper
34 extension flange
34a radially inner section
34b sloped intermediate section
34c windows
34d radially outer section
34e fastener holes
34f spacer head receiving holes
34g guide holes
36 extension hub
36a inner circumferential surface
36b hub portion
36c shoulder
38 splines or teeth
40 splines or teeth
42 fasteners
42a first head
42b second head
44 spacer bolts
46 plastic spacers
48 support washer
50 diaphragm spring

What is claimed is:

1. A drive assembly for a vehicle drive train comprising:
a base assembly including a base hub configured for non-rotatably connecting to an outer circumferential surface of a transmission input shaft, the base assembly including a torsional damper, the torsional damper including an input section and an output section drivingly connected by springs, the springs allowing relative rotation between the input section and the output section, the output section of the torsional damper being directly non-rotatably fixed to the base hub; and
a hub assembly extension configured for non-rotatably connecting to an engine crankshaft, the hub assembly extension being non-rotatably fixed to the input part of the torsional damper at an engine side of the torsional damper, the torsional damper allowing relative rotation between the hub assembly extension and the base hub, the base hub having an annular shape and including an inner circumferential surface defining an innermost circumferential surface of the base assembly, the inner circumferential surface configured for receiving and directly non-rotatably connecting to the outer circumferential surface of the transmission input shaft.

2. The drive assembly as recited in claim 1 wherein the hub assembly extension includes an extension hub having an annular shape and including an inner circumferential surface configured for receiving and directly non-rotatably connecting to an outer circumferential surface of the engine crankshaft.

3. The drive assembly as recited in claim 2 wherein the hub assembly extension includes an extension flange including a radially inner section non-rotatably connected to an outer circumferential surface of the extension hub.

4. The drive assembly as recited in claim 3 wherein the extension flange is non-rotatably fixed to the input section of the torsional damper.

5. The drive assembly as recited in claim 4 wherein the extension flange is non-rotatably fixed to the input section of the torsional damper by fasteners passing through a radially outer section of the extension flange.

6. The drive assembly as recited in claim 5 wherein the extension flange includes a sloped intermediate section radially between the radially inner section and the radially outer section, the sloped intermediate section extending axially toward the torsional damper while extending radially outward from the radially inner section to the radially outer section.

7. The drive assembly as recited in claim 6 wherein the input part includes an engine side cover plate and a transmission side cover plate each including windows for receiving the springs, the engine side cover plate including a radially outer section outside of the windows thereof, the fasteners passing through the radially outer section of the engine side cover plate.

8. The drive assembly as recited in claim 2 wherein the inner circumferential surface of the extension hub is greater than the inner circumferential surface of the base hub.

9. The drive assembly as recited in claim 2 wherein the base hub and the extension hub are separate parts connected together by the torsional damper and the extension flange such that the torsional damper allows relative rotation between the extension hub and the base hub.

10. A method of constructing a drive assembly for a vehicle drive train comprising:
constructing a base assembly including a base hub configured for non-rotatably connecting to an outer circumferential surface of a transmission input shaft, the base assembly including a torsional damper, the torsional damper including an input section and an output section drivingly connected by springs, the springs allowing relative rotation between the input section and the output section, the output section of the torsional damper being non-rotatably fixed to the base hub; and
non-rotatably fixing a hub assembly extension to the input part of the torsional damper at an engine side of the torsional damper, the hub assembly extension being configured for non-rotatably connecting to an engine crankshaft, the torsional damper allowing relative rotation between the hub assembly extension and the base hub,
the hub assembly extension includes an extension hub including an inner circumferential surface configured for receiving and directly non-rotatably connecting to an outer circumferential surface of the engine crankshaft.

11. The method as recited in claim 10 further comprising constructing the hub assembly extension by non-rotatably connecting a radially inner section of an extension flange to an outer circumferential surface of the extension hub.

12. The method as recited in claim 11 wherein the non-rotatably fixing of the hub assembly extension to the input part of the torsional damper including non-rotatably fixing the extension flange to the input section of the torsional damper.

13. The method as recited in claim 12 wherein the extension flange is non-rotatably fixed to the input section of the torsional damper by fasteners passing through a radially outer section of the extension flange.

14. The method as recited in claim 13 wherein the extension flange includes a sloped intermediate section radially between the radially inner section and the radially outer section, the sloped intermediate section extending axially toward the torsional damper while extending radially outward from the radially inner section to the radially outer section.

15. The method as recited in claim 14 wherein the input part includes an engine side cover plate and a transmission side cover plate each including windows for receiving the springs, the engine side cover plate including a radially outer section outside of the windows thereof, the fasteners passing through the radially outer section of the engine side cover plate.

16. The method as recited in claim 15 wherein an inner diameter of the extension hub is greater than an inner diameter of the base hub.

17. A drive assembly for a vehicle drive train comprising:
a base assembly including a base hub configured for non-rotatably connecting to an outer circumferential surface of a transmission input shaft, the base assembly including a torsional damper, the torsional damper including an input section and an output section drivingly connected by springs, the springs allowing relative rotation between the input section and the output section, the output section of the torsional damper being non-rotatably fixed to the base hub, the input section of the torsional damper including an engine side cover plate; and
a hub assembly extension configured for non-rotatably connecting to an engine crankshaft, the hub assembly extension being non-rotatably fixed to the input part of the torsional damper at an engine side of the torsional damper, the torsional damper allowing relative rotation between the hub assembly extension and the base hub,
the engine side cover plate including windows for receiving the springs, outer circumferential edges of the windows being formed by wings of the engine side cover plate protruding axially away from and radially inward from the radially outer section of the engine side cover plate, the hub assembly extension including an extension flange including a plurality of circumferentially spaced windows receiving the wings.

18. The drive assembly as recited in claim 17 wherein the extension flange includes a radially inner section non-rotatably connected to an outer circumferential surface of the extension hub, a radially outer section and a sloped intermediate section radially between the radially inner section and the radially outer section, the sloped intermediate section extending axially toward the torsional damper while extending radially outward from the radially inner section to the radially outer section, the sloped intermediate section including the plurality of circumferentially spaced windows receiving the wings, the radially outer section of the extension flange contacting and non-rotatably fixed to a radially outer section of the engine side cover plate.

19. The drive assembly as recited in claim 18 wherein the radially outer section of the extension flange is non-rotatably fixed to the radially outer section of the engine side cover plate by fasteners passing through the radially outer section of the extension flange and the radially outer section of the engine side cover plate.

20. The drive assembly as recited in claim 17 wherein the inner circumferential surface of the extension hub includes splines or teeth for non-rotatably connecting to the engine crankshaft.

* * * * *